No. 808,310. PATENTED DEC. 26, 1905.
A. A. ROSENGRÈN.
AUTOMATIC COUPLING FOR RAILWAY CARS.
APPLICATION FILED JAN. 23, 1905.
4 SHEETS—SHEET 1.
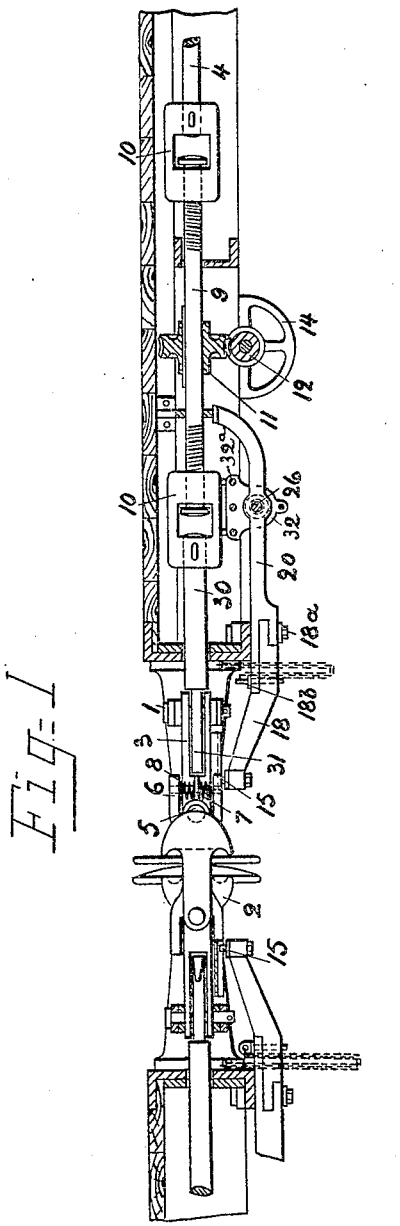
Witnesses
Inventor
Anders A. Rosengren
ATTORNEYS

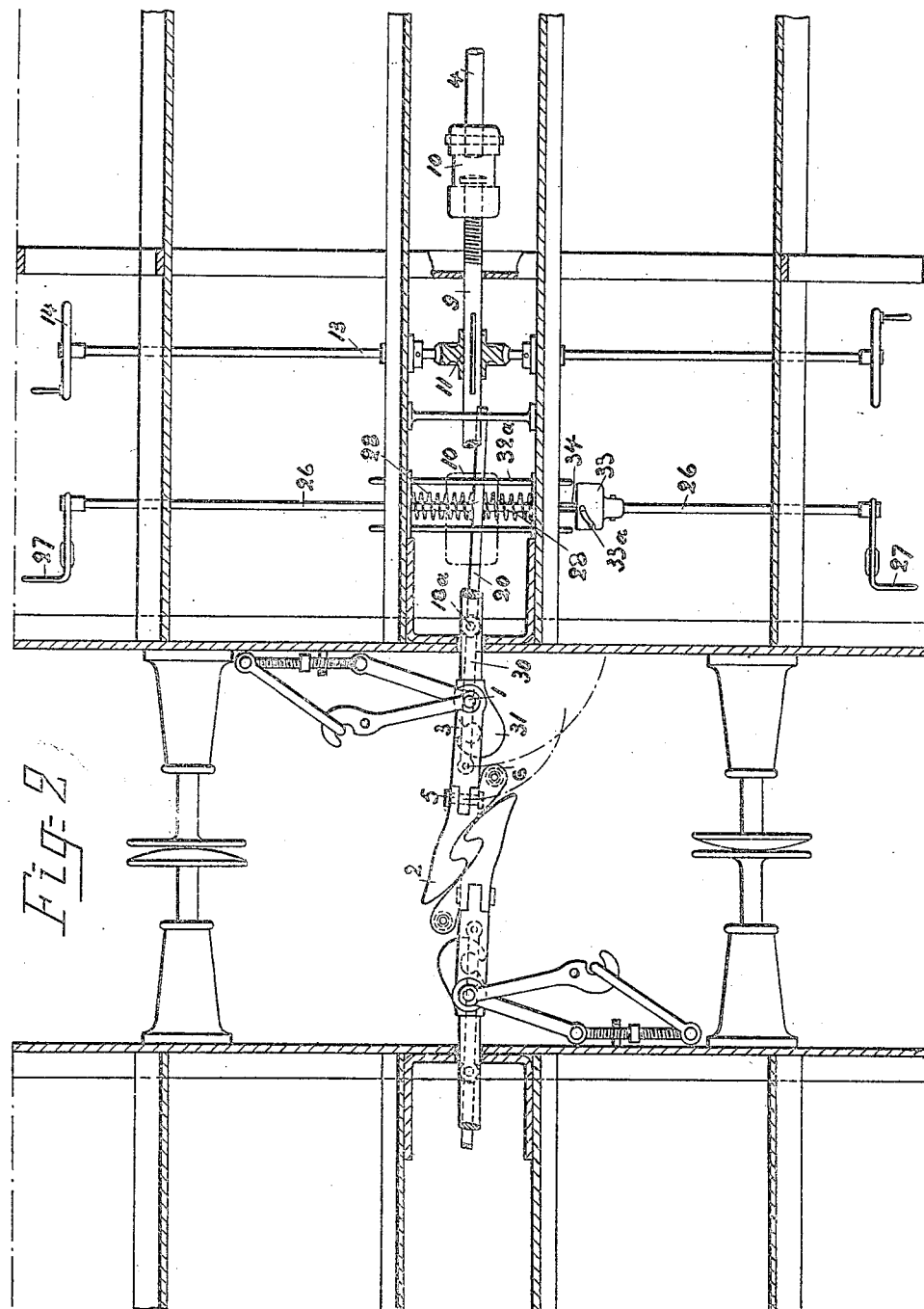

No. 808,310. PATENTED DEC. 26, 1905.
A. A. ROSENGRÈN.
AUTOMATIC COUPLING FOR RAILWAY CARS.
APPLICATION FILED JAN. 23, 1905.
4 SHEETS—SHEET 3.
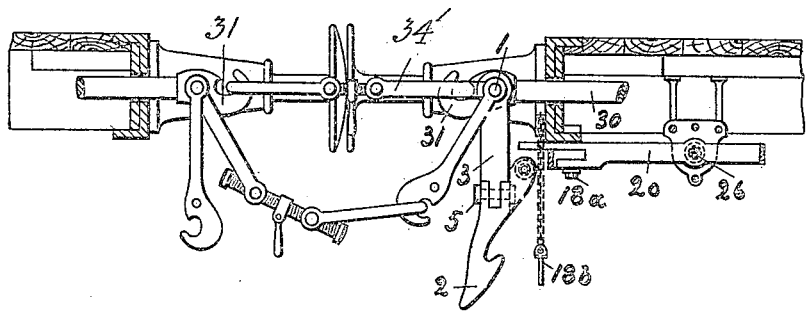
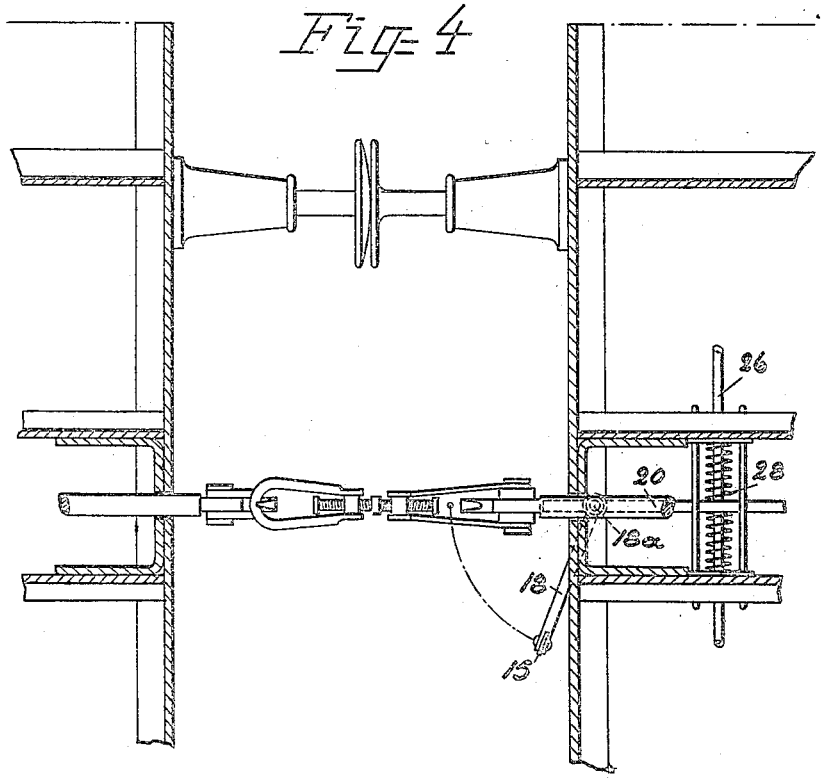
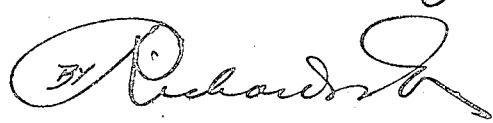

No. 808,310. PATENTED DEC. 26, 1905.
A. A. ROSENGRÈN.
AUTOMATIC COUPLING FOR RAILWAY CARS.
APPLICATION FILED JAN. 23, 1905.
4 SHEETS—SHEET 4.
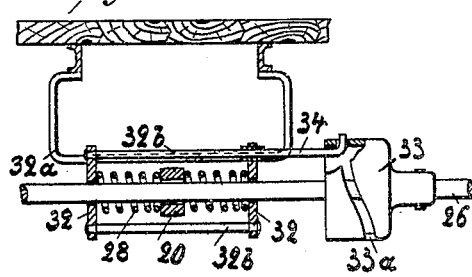
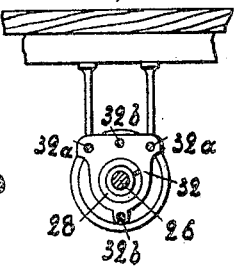
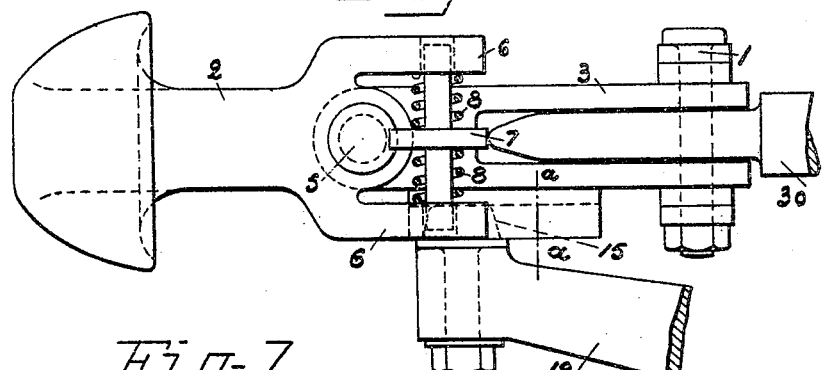
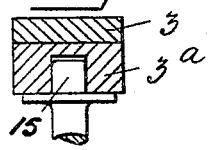
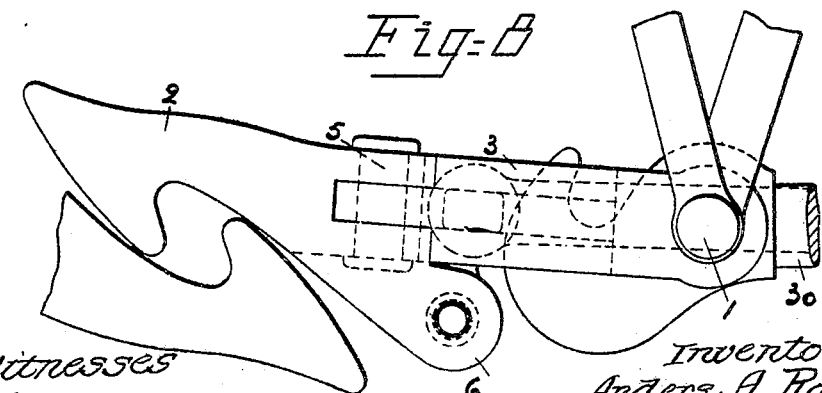

UNITED STATES PATENT OFFICE.

ANDERS ANDERSSON ROSENGRÉN, OF MALMO, SWEDEN.

AUTOMATIC COUPLING FOR RAILWAY-CARS.

No. 808,310.  Specification of Letters Patent.  Patented Dec. 26, 1905.

Application filed January 23, 1905. Serial No. 242,414.

*To all whom it may concern:*

Be it known that I, ANDERS ANDERSSON ROSENGRÉN, engineer, a subject of the King of Sweden and Norway, and a resident of Södra Förstadsgatan 86, Malmo, in the Kingdom of Sweden, have invented certain new and useful Improvements in Automatic Couplings for Railway-Cars, of which the following is a specification, reference being made to the accompanying drawings.

My present invention relates to improvements in automatic car-couplings.

Among the objects of the invention are to provide an extremely simple, durable, and effective construction capable of automatically coupling the cars together and capable of being readily operated from the side of the car and in perfect safety to uncouple the cars, also to provide convenient means by which a car provided with my automatic coupler may be readily and reliably coupled to a car not so provided.

With these and other objects in view the invention includes the features of construction and arrangement and combination of parts hereinafter described, and particularly pointed out in the claims.

The invention is illustrated in the accompanying drawings, in which—

Figure 1 is a central vertical longitudinal section showing a sufficient portion of the frames of two adjoining and coupled cars to illustrate the improved construction. Fig. 2 is a sectional plan of the same. Fig. 3 is a detail sectional elevation showing the position of the parts when the non-automatic coupler is being used. Fig. 4 is a detail plan of the same. Figs. 5 and 5ª are detail views taken at right angles to each other. Fig. 6 is an enlarged detail view of one of the coupler-hooks. Fig. 7 is a sectional detail on line *a a* of Fig. 6, and Fig. 8 is an enlarged plan view of one of the hooks and part of an interlocking hook.

Referring by reference characters to the drawings, the numeral 4 designates the draw-bar of a car, to which the draw-head 30 is connected by a rod 9, having threaded ends engaging boxes 10 and constituting a turnbuckle by which the length of the draw-bar may be adjusted as desired. The draw-head 30 is loosely held in the boxes 10, so as to be capable of being turned therein. The adjustment may be effected by a worm-wheel 11, splined upon the rod 9 and meshing with a worm 12 on a rod 13, extending to the side of the car and adapted to be rotated by a hand-wheel 14.

Upon the front end of the section or draw-head 30 I pivotally mount upon a vertical axis or pin 1 the rear section or member or shank 3 of the coupling-hook. To the opposite end of this section or member 3 I pivotally connect the front section or part or hook proper so as to swing upon a pin or axis 5 at right angles to the pivot 1.

The member or part 2 has rearwardly-extending laterally-deflected ears or lugs 6, which lie properly spaced on opposite sides of a projection 7 on the part or section 3, and upper and lower springs 8, lying between the projections 6 and 7, tend to yieldingly hold the hook portion 2 in neutral position, while allowing it to rise and fall, according to the motion of the cars.

In order to yieldingly hold the coupling-hooks in position to be automatically coupled when the cars come together and also to enable them to be readily uncoupled, the following mechanism is provided: The part 3 preferably carries a grooved block 3ª, in the groove of which works a projection 15 of an arm or lever 18, as shown more clearly in Figs. 6 and 7. The lever 18 is mounted to swing upon a vertical pivot 18ª on the car-frame and is preferably made as a two-part or broken lever, as shown in Fig. 1, to permit one part to swing on the other. For this purpose part 18 is adapted to swing on the pin or pivot 18ª independently of the part 20 when the locking-pin 18ᵇ has been removed. The rear end part 20 of the lever has an opening through which passes a shaft 26, extending transversely of the car and having at one or both ends an operating-crank 27, by which it may be rotated. A frame consisting of end plates 32, (having openings through which shaft 26 passes,) connected by rods 32ᵇ, is slidably supported upon the horizontal parts of the bracket-rods 32ª, carried by the car-frame. Springs 28 are interposed between the end plates and the part 20. One of the rods 32ᵇ has an extended portion 34, provided with an angular bent end which engages with the cam-groove 33ª of a cam-disk 33, fast on the shaft 26. It will thus be seen that according as the shaft 26 is rotated in one direction or the other the frame will be moved accordingly and the lever swung to bring the coupling-hook into coupling position or to uncouple the cars. When the hook is in coupling position, the springs will yield as the hooks come together, and thus cause them to interlock.

In order to enable a car provided with the automatic coupler to be connected to one having a non-automatic coupler, I pivot upon the axis 1 a link device 34′, designed to engage the ordinary hook 31. When this is to be used, the part 18 of the lever is swung to one side, as shown in Fig. 4, and the draw-head or swiveled part 30 given a quarter-turn, so that the hook 2 can drop down out of the way, allowing the link device of the non-automatic coupler to swing vertically.

Having thus described my invention, what I claim is—

1. In a car-coupling of the class described, the combination with the draw-bar and the hook mounted thereon to swing on a vertical axis, of a pivoted lever engaging said hook, a movable frame having yielding means engaging said lever, and an actuating device extending to the side of the car for moving said frame, substantially as described.

2. In a car-coupling of the class described, the combination with the draw-bar and the hook mounted thereon to swing on a vertical axis, of a two-armed lever, a loose connection between one arm thereof and said hook, a frame slidable transversely of the car, a pair of springs carried by said frame, and bearing against opposite sides of the other arm of said lever, and a rotatable shaft having a cam device for moving said slidable frame, substantially as described.

3. In a car-coupler of the class described, a draw-bar having a swiveled part, an automatic coupling-hook pivotally connected with said swiveled part, and a non-automatic coupling device also pivotally connected with said swiveled part, substantially as described.

4. In combination, a draw-bar having a swiveled part, an automatic coupling-hook pivotally connected to said swiveled part, a pivoted lever, operating means extending to the side of the car and yieldingly connected with said lever, a non-automatic coupler also carried by said swiveled part, and a detachable connection between the lever and coupling-hook whereby the automatic hook may be disengaged from its operating mechanism and swing out of the way to permit the non-automatic coupler to be used, substantially as described.

5. In combination, a draw-bar having a swiveled part, an automatic coupling-hook pivoted thereto on a vertical axis, a non-automatic coupling device also carried by said swiveled part, a pivoted lever having a breakable arm, a pin on said arm engaging a groove in the automatic coupling-hook, and yielding means for swinging said lever, substantially as described.

6. In a car-coupler, the combination with the draw-bar of a two-part hook having one of its parts pivotally connected to the draw-bar to swing upon a vertical axis and the second part pivotally connected to the first-named part to swing on a horizontal axis, substantially as described.

7. In a car-coupling of the class described, the combination with the draw-bar and the hook mounted thereon to swing on a vertical axis, of a pivoted lever engaging said hook, parts movable transversely of the car and having yielding means engaging said lever, and an actuating device extending to the side of the car for moving said movable parts, substantially as described.

8. In a car-coupling of the class described, the combination with the draw-bar and the hook mounted thereon to swing on a vertical axis, of a two-armed lever, a loose connection between one arm thereof and said hook, parts movable transversely of the car, springs bearing against said parts and against opposite sides of the other arm of said lever, and a rotatable shaft having a cam device for moving said movable parts, substantially as described.

In witness whereof I have hereunto set my hand in presence of two witnesses

ANDERS ANDERSSON ROSENGRÉN.

Witnesses:
ANDRÉAS LARSON,
ANDERS OTTOSSON.